UNITED STATES PATENT OFFICE.

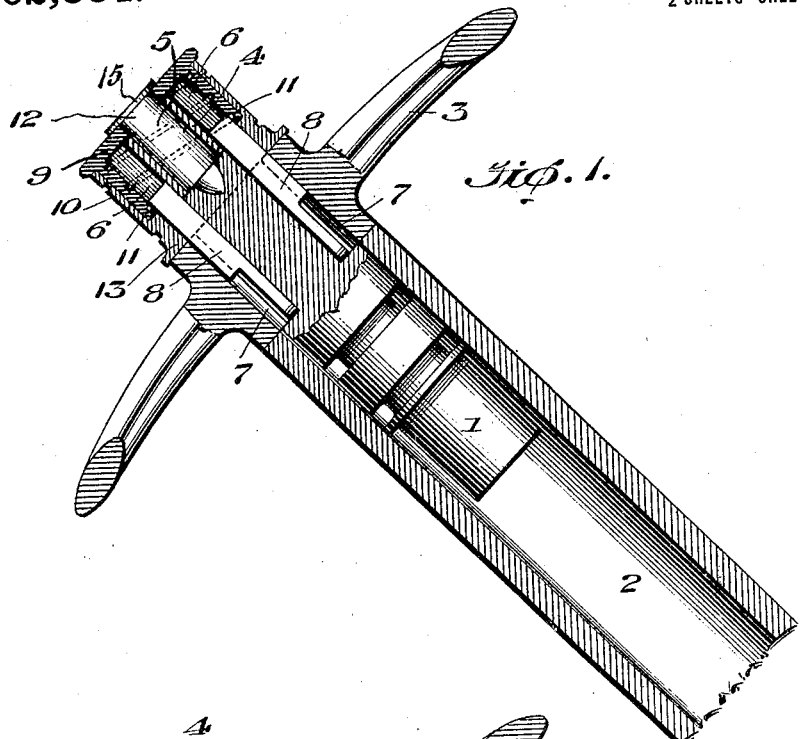
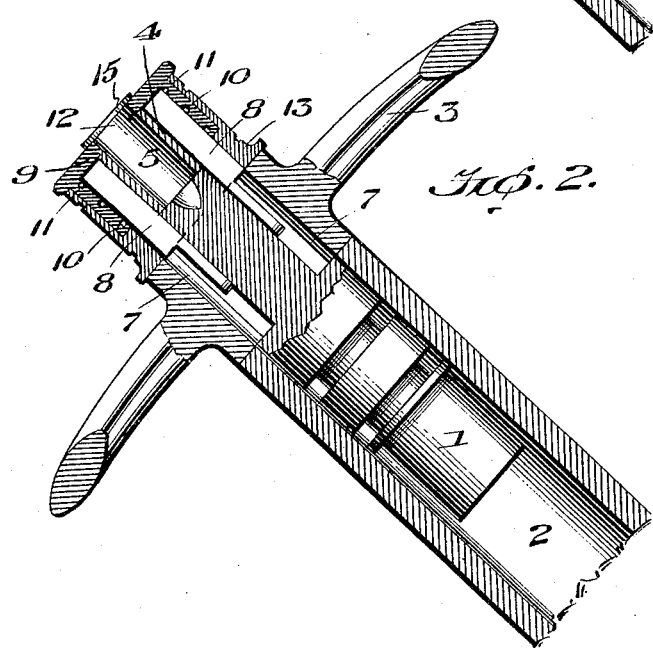

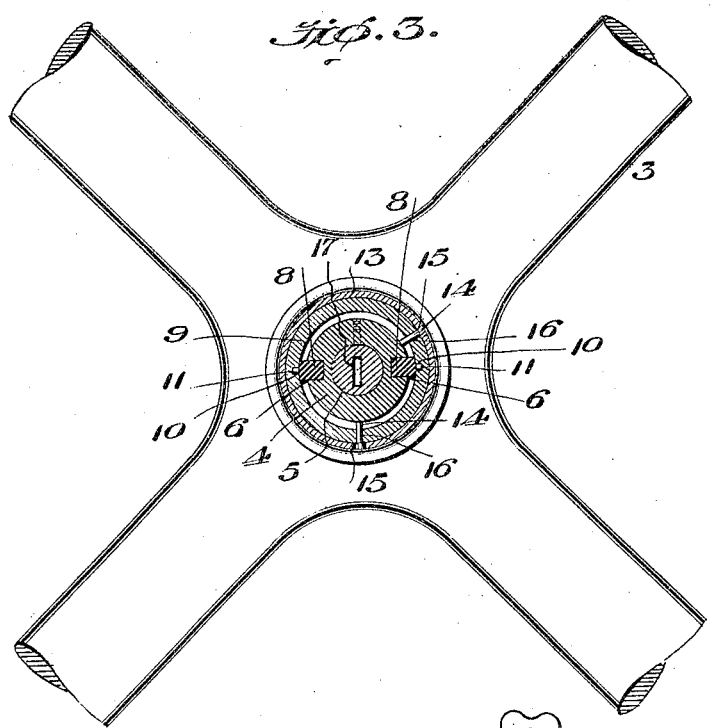

HERBERT A. JAMES, JR., OF WILMINGTON, DELAWARE.

AUTOMOBILE LOCK.

1,402,864.  Specification of Letters Patent.  Patented Jan. 10, 1922.

Application filed September 25, 1919.  Serial No. 326,297.

*To all whom it may concern:*

Be it known that I, HERBERT A. JAMES, Jr., a citizen of the United States, residing at Wilmington, in the county of New Castle and State of Delaware, have invented certain new and useful Improvements in Automobile Locks, of which the following is a specification.

My invention relates to an improvement in locks for automobiles.

The definite end sought by this invention is to provide simple means within the control of the owner or operator of a machine by which the steering wheel may be easily and quickly unkeyed from the steering post of the machine so that unauthorized operation of the machine is precluded, while at the same time the running wheels are free to be turned by hand, to steer the machine, should the emergency arise for moving it a short distance, such as running it in or out of the garage; in other words this invention is to connect or disconnect the steering wheel so that the running wheels are left perfectly normal but passive and no longer under the control of the steering wheel when disconnected, although controllable from the steering wheel when connected.

This invention consists in a general way, in a nut secured to the upper end of the steering post just above the steering wheel, the nut and upper end of the post having keyways which register with each other and with the regular keyways in the hub of the steering wheel, when the wheel is locked to the post, keys fitted to slide in these keyways, and lockable means wholly within the control of the operator for moving said keys in or out of the keyways in the hub of the steering wheel, to lock or unlock the wheel.

In the accompanying drawings, Figure 1, is a vertical section through the post, wheel, nut, keys, and other connected parts showing them locked;

Figure 2, is a similar view showing the wheel unlocked;

Figure 3, is a horizontal section;

Figure 4, is a section through the telescoping locking cylinder and rotatable guard;

Fig. 5 is a view of the upper end of the steering-post with the cylindrical nut removed and shown thereabove, and Fig. 6 is a sectional view similar to Figs. 1 and 4, taken at right-angles thereto.

The numeral 1, represents the steering post, which runs down through the steering column 2, in the usual manner. The steering wheel 3, is mounted on the upper end of the post 1, as customary, but in lieu of the usual nut, screwed on at the top over the wheel, a specially constructed cylindrical nut 4, is employed and this has a longitudinal bore 5, through the longitudinal center, and is provided with keyways 6, preferably two in number, diametrically opposite each other and also running longitudinally, and in position to register with the notches or keyways 7, in the hub of the steering wheel 3, which latter is free to turn on the post when these three parts, namely post, wheel and nut are assembled and before the other parts are in place. Keys 8, are fitted loosely to these keyways 6 and 7 and can slide by gravity therein, if permitted. These keys are formed on two diameters, the smaller of which slips into the space between the bore of the wheel hub and the end of the post and the key is in this way held in place at its lower end, while the upper end of the key with the larger diameter just fits and fills the keyways 6 and 7 when they are in registry and the keys are dropped into them to lock the steering wheel 3, on the post.

The locking cylinder 9 is fitted to turn on the cylindrical nut 4, and it is provided internally with a double screw thread 10, which threads receive the pins 11, on the keys and as the locking cylinder is turned to the right it lifts the keys out of the keyways 7, in the steering wheel hub forcing the keys against the head of the cylinder, thereby stopping the further rotation of the latter, and at the same time unlocking the steering-wheel from the post and consequently it is impossible to steer or control the direction of the machine from the wheel. By reversing the locking cylinder the keys 8, are dropped back into keyways 7, where they are held by the locking cylinder.

The locking cylinder 9, has a hole 12, in its top in alinement with the central bore 5, of the nut 4, and the locking cylinder may be locked by means of the plug 17 inserted within and adapted to turn with the cylinder 9, the plug carrying the usual pins 18 slidably received in the openings 19, which openings are adapted to register with the resilient pins 20 carried by the nut 4, which normally protrude into the openings 19 in the plug and prevent the rotation of the plug and cylinder 9, said pins 20, however, are dislodged from the opening 19 by the insertion of a key 21, after which the cylinder 9 may be rotated at will.

A cylindrical guard 13, is rotatably mounted on the cylindrical nut 4, and this guard and the locking cylinder are telescopically fitted togther. The special function of this guard is to protect the nut 4, and the keys 8, by precluding access thereto, the guard being always free to rotate, makes it impossible to apply a wrench or other tool to dismember the enclosed parts.

In assembling the parts thus described, first the steering wheel is placed on the post, then the nut 4, is screwed on over the hub of the wheel. The rotatable guard 13, is then slipped over the nut 4, and the keys are dropped into the keyways, after which the locking cylinder is put in place. Dowel pins 14, are then inserted through holes 15, in the guard and fastened in holes 16, in the locking cylinder, with their inner ends extending into the circumferential grooves in the outer surface of the nut 4, thereby preventing the several parts thus secured from being separated.

When the operator of the vehicle leaves the machine the locking cylinder is simply turned to the right as far as it will go. This lifts the keys out of the keyways 7, whereupon the key is removed locking the nut 4 and cylinder 9 together. The steering wheel is now entirely released from the post and the wheel no longer controls the movement of the car and only the one having the key can release the locking cylinder, but when this is done and the locking cylinder is turned back, to the left the wheel is again locked securely to the steering post.

It is of course understood that any approved form of lock may be used to fasten the locking cylinder and I do not therefore care to be confined to any particular type or make of lock, nor is it essential that a key lock be used as a form of combination lock would fully answer the requirements and perhaps be preferred by some.

Furthermore the construction described represents an approved form of my invention but is not by any means the only form it may take and hence I do not wish to be restricted thereto.

I claim—

1. The combination with a steering post, a steering wheel loosely mounted thereon, and a cylindrical nut secured on the post for holding the wheel thereon, of locking means for locking the wheel to the post which means comprehends a locking cylinder rotatably connected with the nut, and keys actuated by the locking cylinder to enter keyways in the hub of the wheel to lock the latter to the post.

2. The combination with a steering post, having keyways at the wheel end thereof, a steering wheel mounted loosely on the post and provided with keyways in its hub in position to register with the keyways in the wheel end of the post under certain conditions, and keys slidably mounted in said keyways, of rotatable means carried by and in axial alignment with the post for controlling the keys to cause them to lock or unlock the wheel.

3. The combination with a steering post, having keyways at the wheel end thereof, a steering wheel mounted loosely on the post and provided with keyways in its hub in position to register with the keyways in the wheel end of the post under certain conditions, keys slidably mounted in said keyways, of rotatable means carried by and in axial alignment with the post for controlling the keys to cause them to lock or unlock the wheel, and a rotatable guard rotatably mounted around the hub and locking cylinder.

4. An automobile lock which includes a post, a steering-wheel loosely mounted thereon, a cylindrical nut for holding the wheel on the post, said nut having a keyway and the hub of the wheel having a notch in position to align with the keyway, a key slidable in the keyway and the notch in the hub, the key provided with a laterally extending pin, and a locking cylinder fitted to turn on the nut and embrace the key having an internal thread which receives the pin on the key adapted to move the key endwise as the locking cylinder is turned, whereby to lock or unlock the wheel according to the direction in which the locking cylinder is turned.

5. An automobile lock which includes a post, a steering-wheel loosely mounted thereon, a cylindrical nut for holding the wheel on the post, said nut having a keyway and the hub of the wheel having a notch in position to align with the keyway, a key slidable in the keyway and the notch in the hub, the key provided with a laterally extending pin, a locking cylinder fitted to turn on the nut and embrace the key having an internal thread which receives the pin on the key adapted to move the key endwise as the locking cylinder is turned, whereby to lock or unlock the wheel according to the direction in which the locking cylinder is turned, and a cylindrical guard rotatably mounted upon the locking cylinder and retained in place thereby.

In testimony whereof I affix my signature.

HERBERT A. JAMES, Jr.